United States Patent [19]
Inns et al.

[11] 3,934,997
[45] Jan. 27, 1976

[54] PRODUCTION OF ONE-PIECE STEMWARE FROM GLASS, ETC.

[75] Inventors: David Harold Inns, Chesterfield; William Roy Bennett, Dronfield, near Chesterfield; Arnold Chambers, Chesterfield, all of England

[73] Assignee: Glass Tubes and Components Limited, Chesterfield, England

[22] Filed: Dec. 4, 1974

[21] Appl. No.: 529,537

Related U.S. Application Data

[60] Continuation of Ser. No. 385,880, Aug. 6, 1973, abandoned, which is a division of Ser. No. 275,447, July 26, 1972, Pat. No. 3,773,490.

[30] Foreign Application Priority Data

Aug. 2, 1971 United Kingdom............... 36199/71

[52] U.S. Cl............................. 65/109; 65/DIG. 10
[51] Int. Cl.²......................................... C03B 21/00
[58] Field of Search ............ 65/DIG. 10, 78, 79, 82, 65/242, 102, 109

[56] References Cited
UNITED STATES PATENTS

| | | | |
|---|---|---|---|
| 1,778,743 | 10/1930 | William et al. | 65/DIG. 10 |
| 3,271,123 | 9/1966 | Benard | 65/82 X |
| 3,788,829 | 11/1974 | Miner et al. | 65/79 |
| 3,792,988 | 2/1974 | Nowak et al. | 65/79 |

Primary Examiner—S. Leon Bashore
Assistant Examiner—Frank W. Miga
Attorney, Agent, or Firm—Kemon, Palmer & Estabrook

[57] ABSTRACT

Glass or like stemware is manufactured in one piece by part-forming an article having a glob of material in the position where the stem is required, placing the glob between rollers which have a shape defining the required shape of the stem, and rotating the glob between the rollers while advancing the rollers inwardly. Subsequently a foot forming member is axially advanced towards the glob to apply pressure against the glob to form a radially-extending foot.

7 Claims, 11 Drawing Figures

PRODUCTION OF ONE-PIECE STEMWARE FROM GLASS, ETC.

This is a continuation of application Ser. No. 385,880 filed Aug. 6, 1973, now abandoned, which is a division of Ser. No. 275,447, filed July 26, 1972, now U.S. Pat. No. 3,773,490.

This invention relates to the production of one-piece stemware from glass and other viscous settable materials.

Typically such articles are at present made by the processes described in British Pat. Specifications Nos. 822,585 and 833,590. In the first of these the foot is formed in a blow moulding machine by upwards pressure on the bottom of the blown glass, and in the second the foot is withdrawn to form a neck between the foot and the bowl. Neither method permits the fabrication of more complex stem shapes.

According to this invention there is provided a method of manufacturing a stemmed article from a viscous settable material comprising the steps of providing a part-formed article having a glob of material in the position where the stem is required, placing the glob between shaped rollers and rotating the glob between the rollers while advancing the rollers inwardly to form a stem having a profile defined by the surface of the rollers.

Preferably a foot forming member is subsequently advanced axially towards the glob to apply pressure thereagainst so as to form a radially extending foot on the article.

According to the invention there is also provided apparatus for manufacturing a stemmed article from a viscous settable material, comprising means for rotatably supporting a part-formed article with part thereof between parallel shaped rollers, and means for advancing the rollers towards each other to form a stem on the article.

The invention will be described in more detail, by way of example, with reference to the accompanying drawings, in which:

FIG. 1 shows a part-formed glass article having a bowl 10 and a glob 12 of material attached to the bowl in the position where it is desired to have the stem of the finished article. The part-formed article can be produced by conventional forming methods and has the following basic requirements:

1. A neck ring 14 suitable for the acceptance of jaws holding the component whilst being rotated.

2. The cylindrical glob 12 of glass of suitable dimensions for the formation of the stem and foot.

3. The provision that the neck ring and glob are true and concentric with each other.

These requirements for the work-piece can all be produced and maintained by conventional blow/-moulding or other forming methods used on existing machinery. An accurately predetermined weight of glass is used in the blow/moulding operation, so that the part-formed article of FIG. 1 has an accurate shape and an accurate weight of glass in the glob 12. This leads to good geometrical and dimensional stability in the subsequent formation of the stem.

Figure 2:
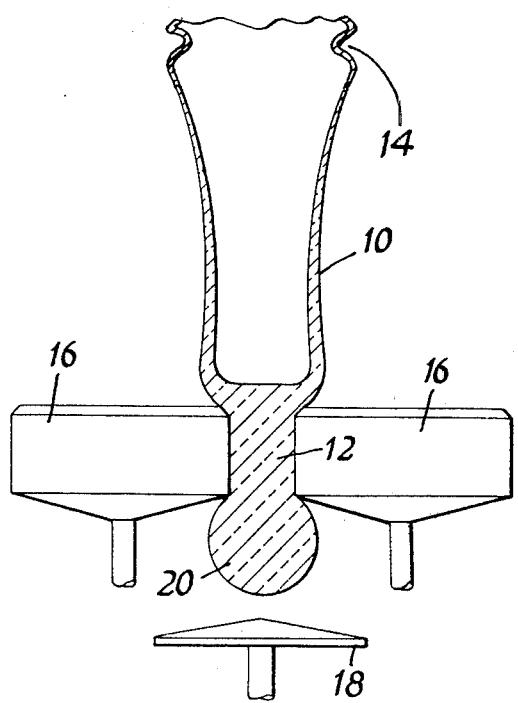
FIGS. 2 to 4 are schematic diagrams illustrating in a simplified manner the operation of a stem forming machine embodying the invention, the three figures showing successive stages in the method.
Figure 3:
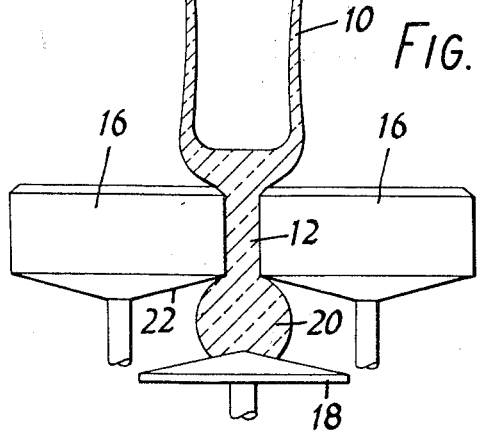
Figure 4:
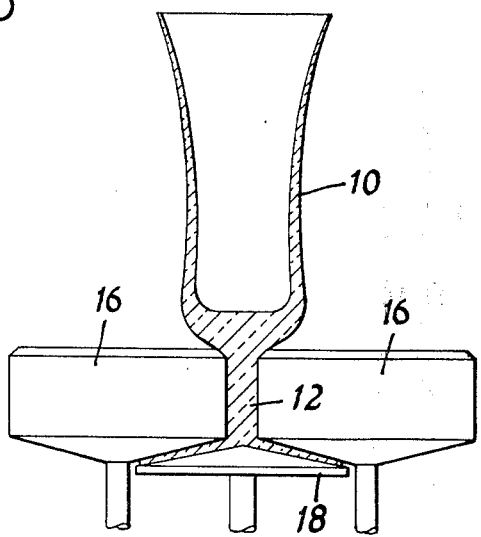

The part-formed article is transferred to a separate machine, illustrated diagrammatically in FIGS. 2 to 4, without delay in order to minimise heat loss. This can be done manually or with an automatic transfer device. The stem-forming machine consists essentially of three freely-rotatable shaped rollers 16 which are equispaced around the part-formed article 10 and which are automatically displaced radially inwards. The part-formed article is held by its neck ring 14 in rotatable jaws (not shown), and the rollers 16 are positioned square and concentric with the jaws. A cam advances the rollers 16 inwardly towards the glob 12, one of the rollers reaching the glob before the other two so as to allow the first roller to true up the revolving glob 12 prior to final forming, and to allow gas jets to continue to play on the glob for as long as possible with as little contact as necessary between roller and glob.

Three columns of gas jets are disposed equidistantly about the centre of the forming mechanism between the rollers. The temperature of the flame is adjustable, with the lower jets being controlled independently of the upper jets during formation of the foot.

To form the foot, a foot forming plate 18 is situated below the level of the rollers 16 with its centre axis on the axis of the jaws. The foot forming plate can revolve freely and at the same speed as the jaws. It is also provided with a vertical drive to produce an up or down motion, with pressure exerted during the upward movement.

Figure 1:
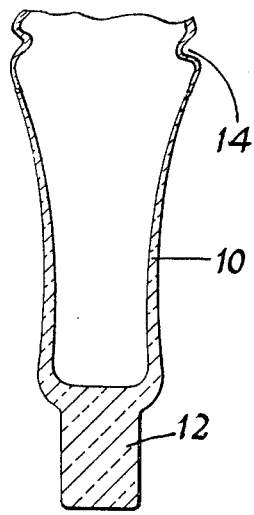
FIG. 1 is a cross-section through a part-formed glass article which is to be provided with a stem and foot.

The manufacture proceeds as follows. Initially the gas jets are lit and set to achieve a suitable temperature. A workpiece having the shape shown in FIG. 1 is formed on a conventional blow/moulding machine and is transferred with as little delay as possible to the stem-forming machine so as to retain the heat in the glass. A typical maximum-transfer time would be fifteen seconds.

The workpiece is then held in the jaws which commence to rotate at a predetermined speed, and the jaws are lowered to bring the glob 12 in the correct position relative to the rollers and the gas jets. The first roller is then moved inwardly by the cam plate to bear lightly against the revolving glass glob 12. No real pressure is exerted and this is purely to control the glob when it is in a pliable state. One roller is sufficient to control this and prevent eccentricity of the glob, and by using only one roller a greater area remains for the gas flames to play on the glob and, further, heat loss by contact with the rollers is kept to a minimum. When the glob is brought to the correct temperature, which may take about thirty seconds depending on the size of the glob, the remaining rollers 16 are then brought to bear on the glob. At this stage all the rollers 16 are positioned concentrically around the glob.

The cam plate now moves the rollers 16 symmetrically and evenly inwards towards the axis of the machine, pressure being exerted on the glass. This stage is illustrated in FIG. 2. The glob is thus rolled to a smaller diameter, the surplus glass 20 being forced down below the level of the lower edges of the rollers 16.

When the required stem diameter is reached the rollers are maintained in this position whilst the foot forming plate 18 is raised into contact with the excess glass 20 which has been forced down by the rollers 16, as shown in FIG. 3. The foot forming plate is then raised under steady pressure, and a squeezing action takes place between the foot forming plate 18 and the lower faces 22 of the rollers 16, causing the glass to spread outwardly to form the foot, as shown in FIG. 4.

When this state is reached the gas jets are turned off and the glass allowed to cool. When the glass is sufficiently stable, the foot forming plate 18 is lowered, the rollers 16 move outwards, the jaws are raised and rotation of the jaws is stopped. The article with the completed stem can now be transferred to a burn-off or crack-off process to complete the formation of the bowl 10 by removing the moil, and remove the neck ring.

With small glasses the foot forming plate 18 can remain freely revolving, as described, but with larger articles it may be necessary to drive the foot forming plate at the same speed as the jaws, the actual speed of these being adjustable and being determined by the size of the glass being produced.

Figure 5:
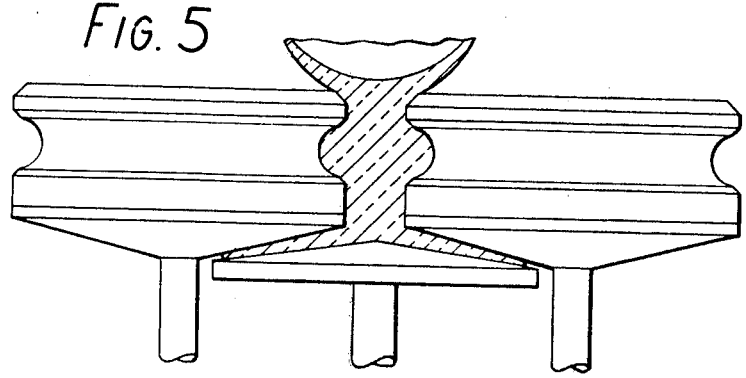
FIG. 5 is a view similar to FIG. 4 showing the production of a relatively complex stem shape.
Figure 5A:
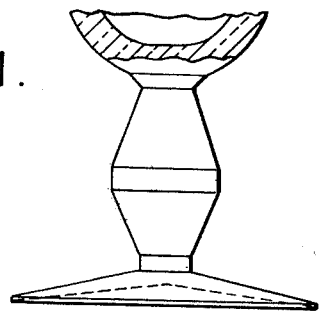
FIGS. 5A and 5B show other stem shapes which can be produced.
Figure 5B:
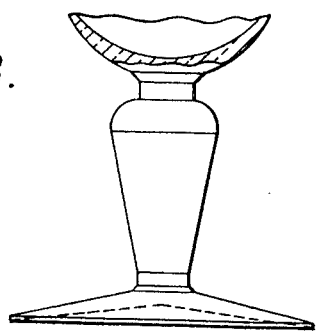

It will be appreciated that the shape of the rollers shown in FIGS. 2 to 4 is purely schematic, and that the process can be used to produce stemware of varying shapes and sizes. One rotationally-symmetrical shape is shown in FIG. 5, and it will be seen that the roller contour is reflected in the shape of the finished stem. Examples of other possible stem shapes are shown in FIGS. 5A and 5B.

It may be possible to provide faceted surfaces to the rollers to produce other stem and foot shape, for example based on a square or hexagonal cross-section.

Figure 6:
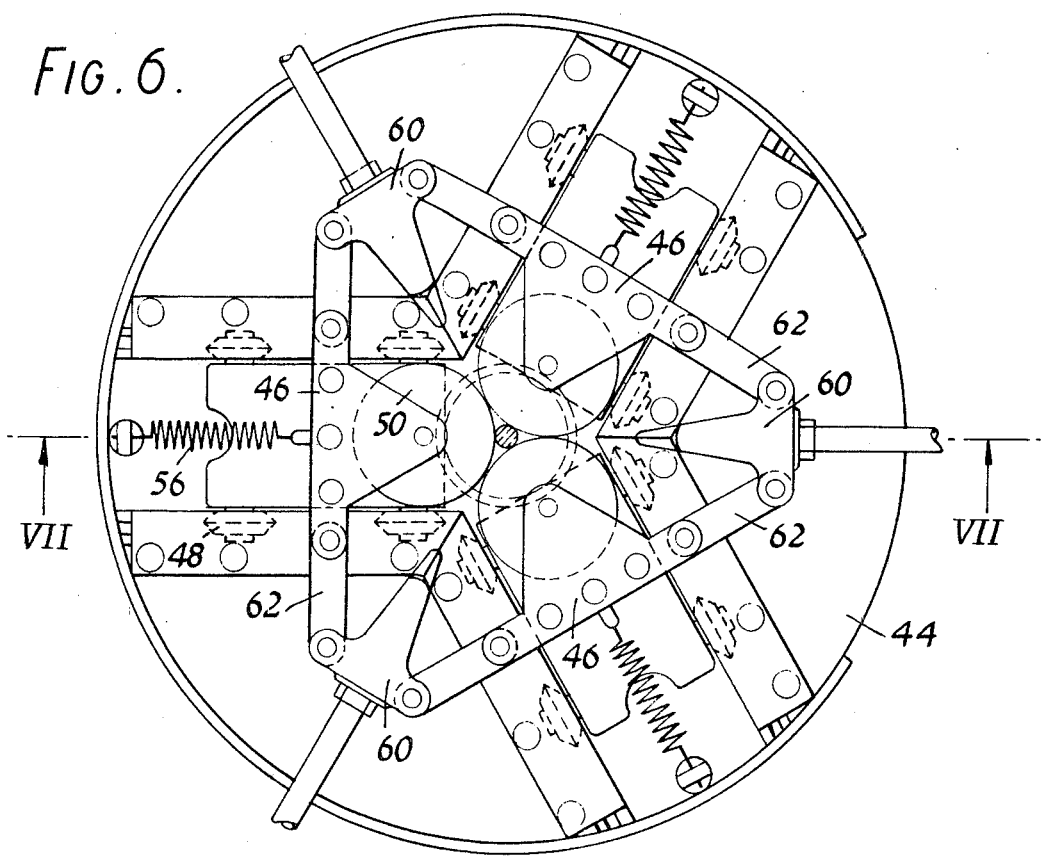
FIG. 6 is a plan view of a stem-forming machine based on FIGS. 2 to 4.
Figure 7:
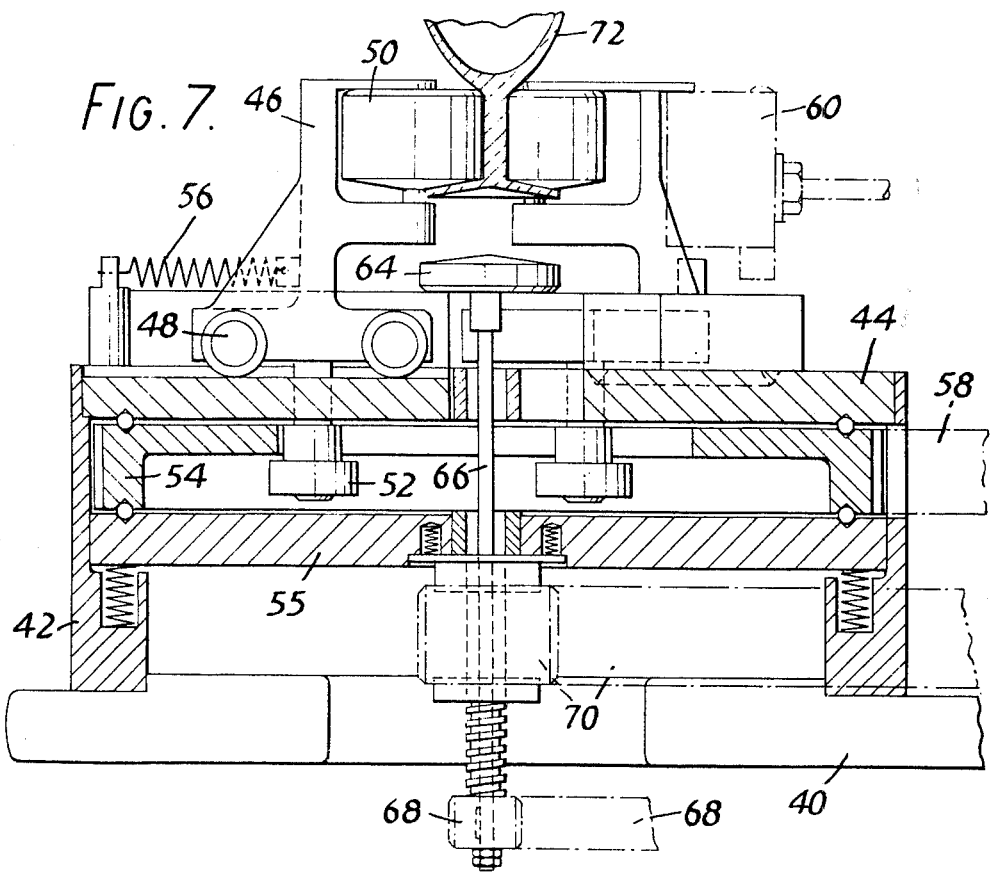
FIG. 7 is a sectional view of the machine of FIG. 6 taken on the line VII—VII.
Figure 8:
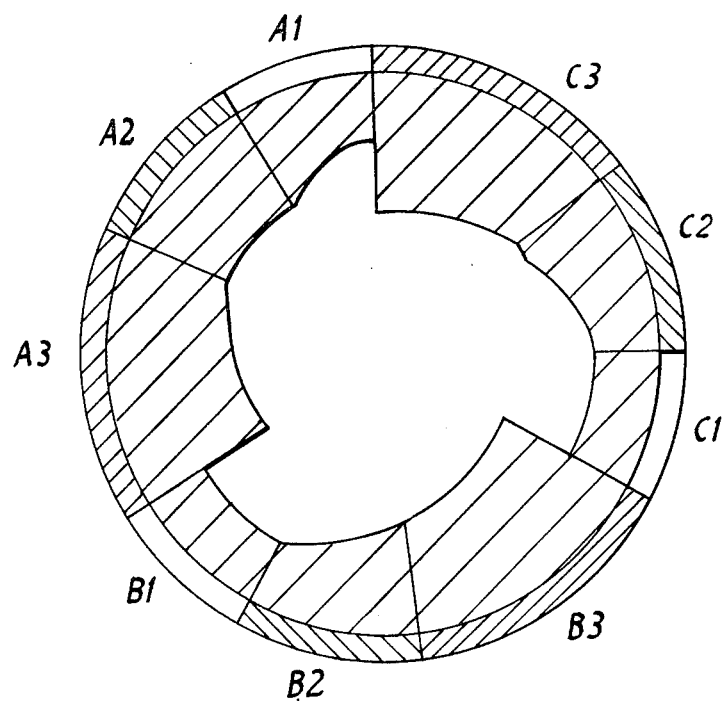
FIG. 8 shows the cam plate of the machine.

FIGS. 6 to 8 illustrate a stem-forming machine which utilises the principles described with reference to FIGS. 2 to 4. The machine has a machine frame 40 which carries a hollow cylindrical housing 42 which in turn supports a top plate 44. On the plate 44 run three roller brackets 46 provided with rollers 48 by means of which they can travel radially inwardly and outwardly. The brackets 46 carry corresponding rollers 50 which correspond to the rollers 16 of FIGS. 2 to 4. In this case also the rollers are shown with a simplified profile. The rollers 50 are freely rotatable on the brackets 46.

Each bracket 46 has a downward arm 52 which projects through a slot in the plate 44 and engages a cam plate 54. To bias the arms 52 against the cam plate each bracket 46 is provided with a tension spring 56 which exerts an outward pull on the bracket. The cam plate 54 is rotatably mounted between the bearing plate 55 supported in housing 42 and the top plate 44 and can be driven through a drive gear 58.

Gas burners 60 are positioned between the brackets 46 and have inwardly directed gas jets. The burners 60 are linked to the brackets 46 by links 62 which are effective to inter-relate the movement of the burners 60 and brackets 46 so that inwards movement of the brackets 46 causes outwards movement of the burners and vice versa. Thus as the cam plate 54 moves the brackets 46 and hence the rollers 50 inwards, the burners 60 are automatically retracted.

A foot forming plate 64 is mounted at the top of a shaft 66 which can be driven for rotation at its lower end through drive gears 68. The plate 64 together with the shaft 66 can also be moved vertically by drive gears 70 which cooperate with a multi-start thread around the shaft 66 to raise and lower the foot plate.

In view of the above description with reference to FIGS. 2 to 4 it is not believed that a detailed description of the operation of the machine of FIGS. 6 and 7 is required. Briefly, however, a part-formed glass 72 is held by jaws and lowered into the space between the rollers 50, these being in their outermost positions. The gas jets from burners 60 play on the glass glob 12 (see FIG. 1). When the required temperature is reached, the cam plate 54 bears on arms 52 to advance the brackets 46 with rollers 50 and simultaneously withdraw burners 60. When the stem is shaped, the foot-forming plate 64 is raised by gears 70 to form the foot on the glass. If desired, drive is provided to the foot plate from gears 68.

The cam plate 54 is shown in FIG. 8. It is divided into three sectors A, B and C for the three respective rollers 50. Each sector is in turn subdivided into three phases 1, 2 and 3 as shown. Sector A corresponds to the leading roller which is used to true up the glob, and thus phase A1 advances this roller to the centralising position, phase A2 holds it there for re-heating, and phase A3 applies pressure to form the stem. Sectors B and C are identical, phases B1 and C1 causing no movement, phases B2 and C2 causing a steady advance of these two rollers, and phases B3 and C3 being identical to phase A3 to apply pressure to the stem.

The machine shown in FIGS. 6 to 8 also includes a water cooling system for the rollers 50 which has been omitted for simplicity.

Figure 9:
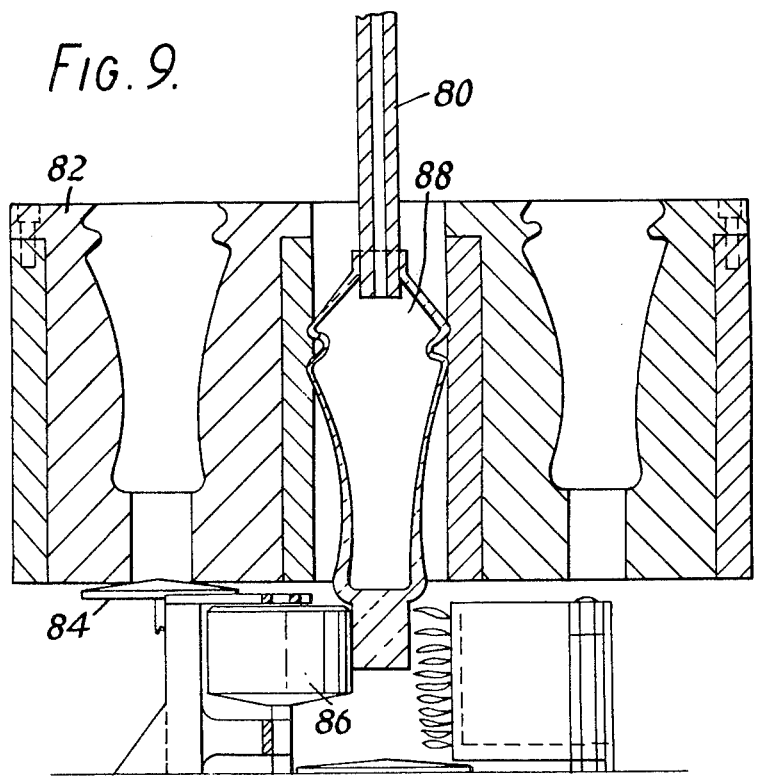
FIG. 9 is a somewhat diagrammatic sectional view of another machine embodying the invention.

Another machine is illustrated diagrammatically in FIG. 9. Here the stem and foot forming takes place on the actual blow/moulding machine used to produce the part-formed article. The figure illustrates two positions. In the first the blow tube 80 is used to blow the bowl and form the glob for the stem and foot in a mould 82 the bottom of which is closed by a foot forming plate 84, the rollers 86 being well retracted. After the blowing operation, the mould is opened and the part-formed article 88, still supported by the blow tube 80, is brought between the rollers 86. Subsequent operation is similar to that of the machine of FIGS. 6 to 8.

This embodiment enables the completed article to be made without transfer to a separate machine.

While the manufacture of glass articles has been described, it will be clearly apparent that the process can be applied to other viscous settable materials.

We claim:

1. A method of manufacturing a stemmed article, such as a drinking vessel or vase, from a viscous settable material, such as glass, comprising the steps of:
   a. providing a part-formed article having a glob of at least semi-molten material in the position where the stem is required;
   b. supporting said part-formed article vertically for rotation about its longitudinal axis with said glob lowermost;
   c. rotating said article about its longitudinal axis while simultaneously rolling the circumferential surface of the glob in a vertical plane with rollers the surfaces of which conform to the desired shape of the finished article;
   d. reducing the distance between the rollers to form the stem of the desired shape and configuration without stretching; and e. advancing a foot-forming member towards the glob and applying pressure thereagainst to form a radially extending foot on said stem.

2. A method according to claim 1, wherein one roller is advanced ahead of the other(s) into initial light contact with the glob.

3. A method according to claim 1, wherein the part-formed article is formed by a blow/moulding technique, and the article is supported by the blow tube while the stem is formed by the rollers.

4. A method according to claim 1, wherein said rollers have upper and lower faces with said lower faces being of conical configuration and cooperating with said foot-forming member to form said radially extending foot.

5. A method according to claim 1, wherein the foot-forming member is freely rotatable.

6. A method according to claim 1, wherein the article is rotated by drive through a jaw, and the rollers are freely rotatable and driven by the article.

7. A method according to claim 1 wherein said rollers and glob of material are rotated about substantially parallel axes.

* * * * *